(12) United States Patent
Iiduka

(10) Patent No.: US 7,176,389 B2
(45) Date of Patent: Feb. 13, 2007

(54) ELECTRONIC BALANCE

(75) Inventor: Atsushi Iiduka, Toyonaka (JP)

(73) Assignee: Shimadzu Corporation, Kyoto (JP)

( * ) Notice: Subject to any disclaimer, the term of this patent is extended or adjusted under 35 U.S.C. 154(b) by 212 days.

(21) Appl. No.: 10/856,827

(22) Filed: Jun. 1, 2004

(65) Prior Publication Data

US 2004/0262047 A1    Dec. 30, 2004

(30) Foreign Application Priority Data

Jun. 25, 2003   (JP)   ............................. 2003-181374

(51) Int. Cl.
*G01G 19/52*   (2006.01)
(52) U.S. Cl. ..................... 177/50; 177/145; 73/1.13
(58) Field of Classification Search ................. 177/50, 177/145, 180, 212; 73/1, 1.13
See application file for complete search history.

(56) References Cited

U.S. PATENT DOCUMENTS 4,932,486 A * 6/1990 Komoto et al. ............... 177/50

FOREIGN PATENT DOCUMENTS

| JP | 10307058 | * 11/1998 |
|---|---|---|
| JP | 2000-74730 | 3/2000 |

* cited by examiner

*Primary Examiner*—Randy W. Gibson
*Assistant Examiner*—Sean Kayes
(74) *Attorney, Agent, or Firm*—Manabu Kanesaka

(57) ABSTRACT

An electronic balance includes a sample plate for placing a sample, a load detecting unit for determining a weight of the sample, a sensitivity calibration mechanism having a calibration weight disposed under the sample plate for applying a load of the calibration weight to the load detecting unit, a weight holding member with a spring property for holding the calibration weight when the load of the calibration weight is not applied to the load detecting unit, and a pressing member disposed above the weight holding member for restricting an upper movement of the weight holding member. The load detecting unit converts a load of the sample placed on the sample plate into an electrical signal according to a sensitivity coefficient to determine the weight of the sample. The sensitivity coefficient is calibrated when the load of the calibration weight is applied to the load detecting unit.

9 Claims, 4 Drawing Sheets

ELECTRONIC BALANCE

BACKGROUND OF THE INVENTION AND RELATED ART STATEMENT

The present invention relates to an electronic balance having a built-in calibration weight.

In general, a conventional electronic balance includes a load detecting unit having a combination of an electromagnetic force balance mechanism and a load sensor in a housing. The load detecting unit detects a load applied to a sensitive member in proportion to a load of a sample placed on a sample plate.

In the electronic balance having the load detecting unit as described above, there may be deviation (error) in a measured result (displayed value) according to a change in an environmental condition, such as a temperature and an air pressure, and lapse of time. Therefore, in order to accurately measure a weight of a sample all the time, it is required to carry out an automatic measurement sensitivity calibration (hereinafter, simply referred to as "sensitivity calibration"). Normally, a weight for the sensitivity calibration is disposed in the electronic balance, and the electronic balance includes a sensitivity calibration mechanism for calibrating the sensitivity by applying the weight.

FIG. 6 is a view showing a sensitivity calibration mechanism in a conventional electronic balance disclosed in Japanese Patent Publication (Kokai) No. 2000-74730. As shown in FIG. 6, in the sensitivity calibration mechanism, a sensitive member 3 is an upright member extending vertically, and an upper end portion thereof protrudes outside through a hole provided in a housing 1. A sample plate 2 is supported on a leading end of the sensitive member 3. A cap-shape weight receptacle 8 is disposed at the vicinity of an upper end portion of the sensitive member 3, for example, right under a supporting portion of the sample plate 2.

The sample plate 2 is an integrated part having a disc shape as a whole, and has a peripheral portion bent downwardly and a hole for inserting the leading end of the sensitive member 3 at a central portion of a lower surface thereof. A calibration weight 4 having a disc shape with a center thereof arranged coaxially with an axis of the sensitive member 3 is disposed in a space between the lower surface of the sample plate 2 and an upper surface of the housing 1.

When a sliding cam mechanism 6 drives a vertically moving bar 5 to push the calibration weight 4 upwardly, the vertically moving bar 5 and a weight holding member 7 hold the calibration weight 4, and the load of the calibration weight 4 is removed from the load detecting unit. When the vertically moving bar 5 is lowered, the load of the calibration weight 4 is applied to the sensitive member 3, so that the calibration is carried out with the calibration weight 4.

In the electronic balance having the calibration weight 4 of the pushing-up type mechanism described above, it is necessary to adjust a height of the vertically moving bar 5 abutting against a lower surface 4a of the calibration weight 4 and an engagement between the weight holding member 7 and the calibration weight 4. It is difficult to simplify a process of the adjustment, thereby causing an obstacle for mass production.

Therefore, in a recent electronic balance, as shown in FIG. 7, an elastic member 9 such as rubber is inserted between the weight holding member 7 for pressing the calibration weight 4 and a column 10 for adjusting a relative height between the weight holding member 7 and the vertically moving bar 5. Alternatively, the vertically moving bar 5 is formed to be extendable for adjusting the relative height between the weight holding member 7 and the vertically moving bar 5.

The conventional electronic balances have the structures as described above. In the electronic balance wherein the elastic material 9 such as rubber is inserted between the weight holding member 7 and the column 10 for adjusting the space between the weight holding member 7 and the leading end of the vertically moving bar 5 as shown in FIG. 7, it is necessary to adjust the space between the weight holding member 7 and the leading end of the vertically moving bar 5 for each electronic balance. However, it is difficult to adjust the height of the weight holding member 7, thereby causing variation in the height. Also, torque applied to a motor in the sliding cam mechanism 6 may vary for each product, thereby causing variation in sound of the motor.

In the electronic balance wherein the vertically moving bar 5 is extended to hold the calibration weight 4, the structure becomes complicated, thereby increasing manufacturing cost. When the electronic balance is transported, the vertically moving bar 5 tends to be displaced downwardly due to vibration or dropping, so that the load sensor may be damaged.

In view of the problems described above, it is an object of the invention to provide an electronic balance wherein the problems described above are solved.

Further objects and advantages of the invention will be apparent from the following description of the invention.

SUMMARY OF THE INVENTION

In order to attain the above objects, according to the invention, an electronic balance includes a sensitivity calibration mechanism wherein a disc-shape calibration weight is disposed coaxially right below a sample plate and a sensitivity is calibrated by applying a calibration weight to a load detecting unit; a weight holding member having an spring property for restraining an upward movement of the calibration weight when a load of the calibration weight is removed; and a pressing member disposed above the weight holding member for restraining an upward movement of the weight holding member.

The electronic balance according to the invention has a simple structure as described above, thereby reducing cost. Further, it is possible to hold the built-in weight without adjusting a height of the weight holding member, thereby increasing impact resistance and reducing a variation in motor sound.

BRIEF DESCRIPTION OF THE DRAWINGS

FIGS. 3(a) and 3(b) are views showing a weight holding member according to the embodiment of the invention, wherein FIG. 3(a) is a plan view thereof, and FIG. 3(b) is a sectional view taken along line 3b–3b in FIG. 3(a);

DETAILED DESCRIPTION OF PREFERRED EMBODIMENTS

Figure 1:
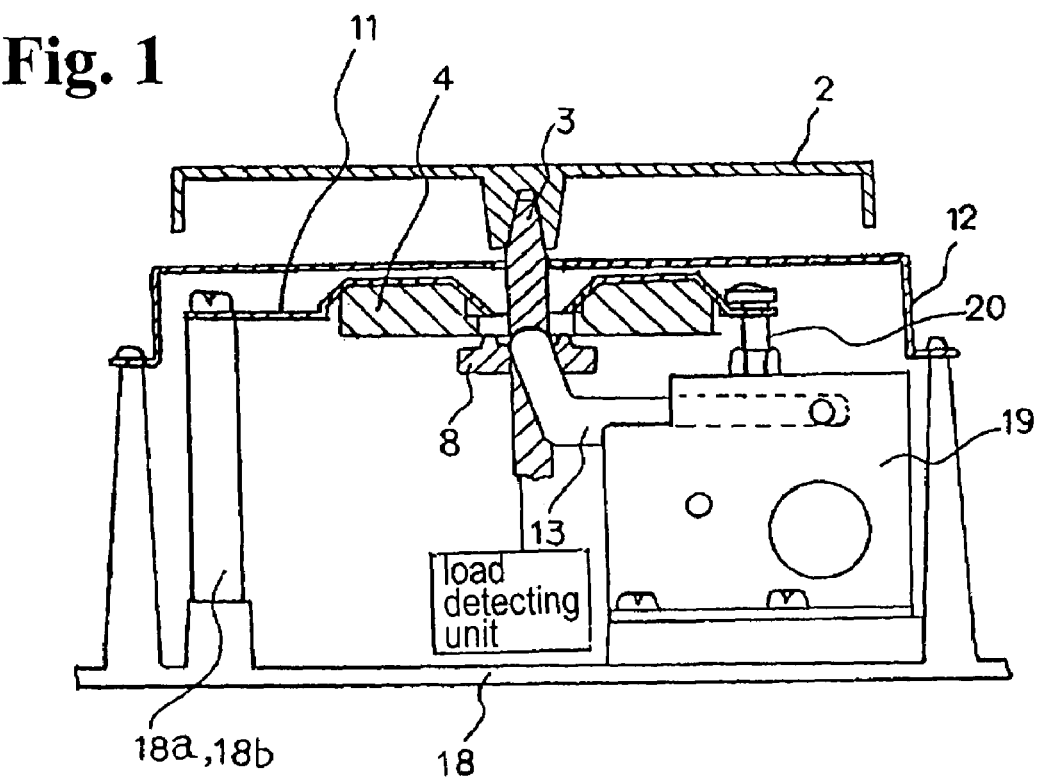
FIG. 1 is a schematic view showing an essential part of an electronic balance according to an embodiment of the invention.
Figure 2:
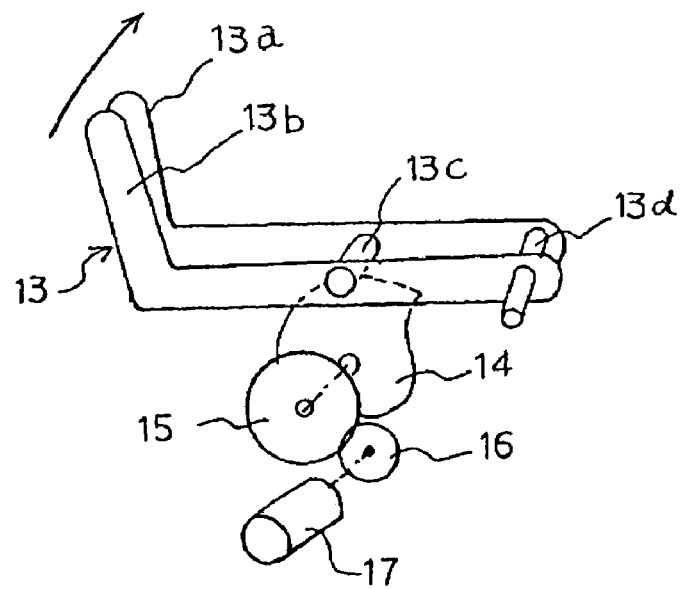
FIG. 2 is a perspective view showing arms and a driving portion according to the embodiment of the invention.

Hereunder, embodiments of the invention will be explained with reference to the accompanying drawings. FIG. 1 shows a structure of an essential part of an electronic balance according to an embodiment. The electronic balance is formed of a load transmitting mechanism for transmitting a load of a sample on the electronic balance to a load detecting unit; a sensitivity calibration mechanism for calibrating sensitivity with a calibration weight; and a weight holding mechanism for holding the calibration weight when the sensitivity calibration is not carried out. The load transmitting mechanical portion includes a sample plate 2 for placing a sample and a sensitive member 3 inserted into a concave portion formed in a backside of the sample plate 2 at a center portion thereof.

The sensitivity calibration mechanism includes a disk-shape calibration weight 4 provided with a through-hole for inserting the sensitive member 3 at a center portion thereof; and a weight moving mechanism for applying a load to the sensitive member 3 by placing the calibration weight 4 on a cup-shape weight receptacle 8 provided to the sensitive member 3. The weight holding mechanism includes a weight holding member 11 for holding the calibration weight 4 removed from the weight receptacle 8; and a pressing member 12 for preventing the weight holding member 11 from being deformed or damaged by an impact when the balance falls down.

A lower end portion of the sensitive member 3 is connected to a load detecting unit (not shown) including a load sensor. An electric signal in proportion to a load of the sample obtained from the load sensor is multiplied by a sensitivity coefficient to obtain a weight of the sample, and a value of the weight is displayed on a display portion (not shown).

The weight moving mechanism is formed of same-shape arms 13a and 13b; connecting shafts 13c and 13d for connecting the arms 13a and 13b; a cam 14 for contacting the connecting shaft 13c to move leading ends of the arms 13a and 13b around the connecting shaft 13d in an arrow direction; gears 15 and 16 for transmitting a rotating force to the cam 14; and a motor 17 for driving the gear 16. The connecting shaft 13c, the gear 15 and a motor 17 are held to a bracket 19 disposed in a chassis 18 as shown in FIG. 1.

The leading ends of the arms 13a and 13b contact a back surface of the calibration weight 4, and slots are formed in the back surface for fitting the leading ends of an arm assembly 13 formed of the arms 13a and 13b. When the motor 17 rotates in the clockwise direction and the arm assembly 13 moves in an arrow direction, the calibration weight 4 is lifted and moves away from the weight receptacle 8. Accordingly, the load of the calibration weight 4 is removed from the sensitive member 3. When the motor 17 conversely rotates in the counter-clockwise direction and the leading ends of the arm assembly 13 move in a direction opposite to the arrow direction, the calibration weight 4 comes down and is seated on the weight receptacle 8, so that the load of the calibration weight 4 is applied to the sensitive member 3.

Figure 3A:
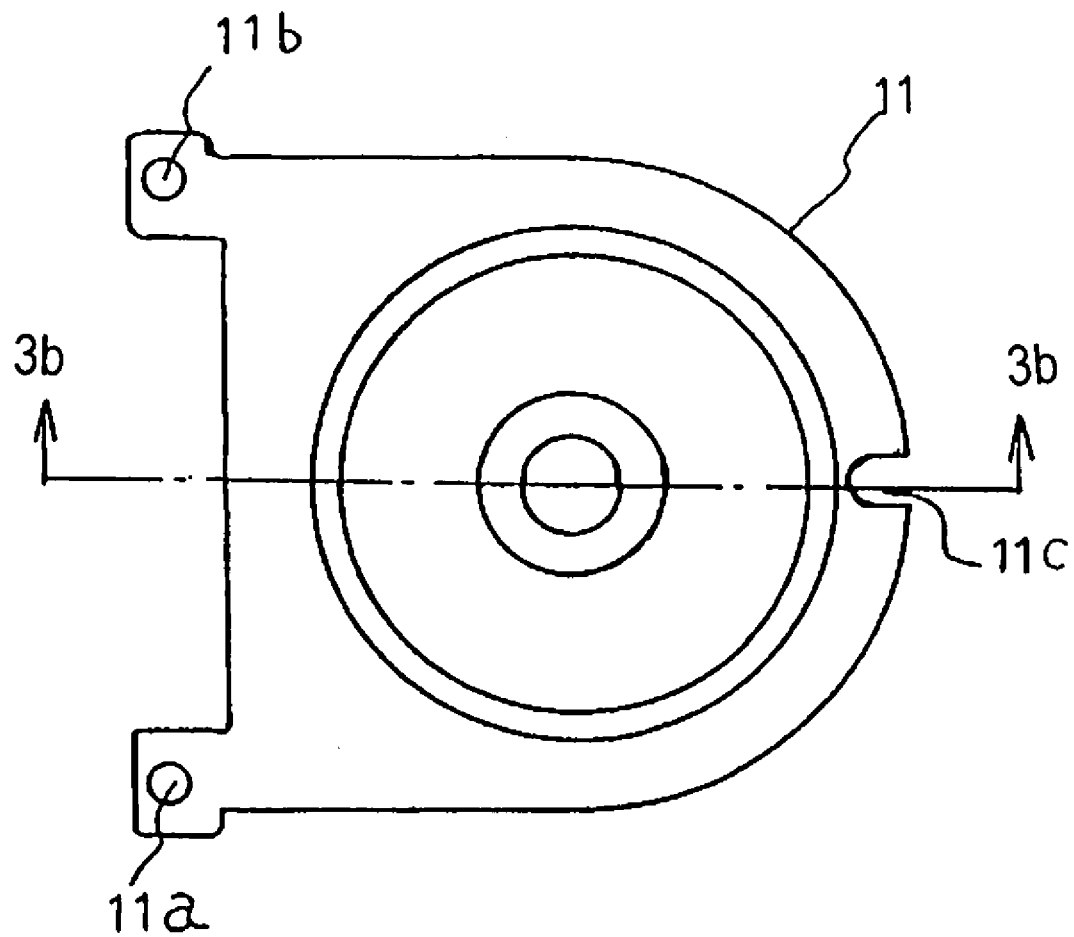
Figure 3B:

As shown in FIG. 1, the electronic balance is in a state where the calibration weight 4 is not loaded on the load detecting unit. The state is selected when a measurement is carried out. At this time, the calibration weight 4 is situated at an upper position and held by the weight holding member 11. The weight holding member 11 is formed of a high hardness metal material such as SUS 304, and is formed in a shape shown in a top plane view in FIG. 3(a) and in a sectional view in FIG. 3(b) taken along line 3b–3b in FIG. 3(a).

Fixing holes 11a and 11b are formed at positions on an arc with a central hole of the weight holding member 11 as the center, and a U-character shape notch 11c is formed at a center of an end portion at the opposite side. The weight holding member 11 is fixed to columns 18a and 18b such that leading ends of the columns 18a and 18b are aligned with the fixing holes 11a and 11b. A shaft portion of a stopper 20 provided on the bracket 19 is fitted into the notch 11c. Accordingly, when the arm assembly 13 lifts the calibration weight 4, a repulsive force of a spring acts on the calibration weight 4, so that the calibration weight 4 is held with the lifting force at the leading ends of the arms 13a and 13b and the repulsive force. Incidentally, the weight holding member 11 is preferably attached with an angle inclined downwardly toward the right side in advance for enhancing the repulsive force of the spring.

Figure 4:
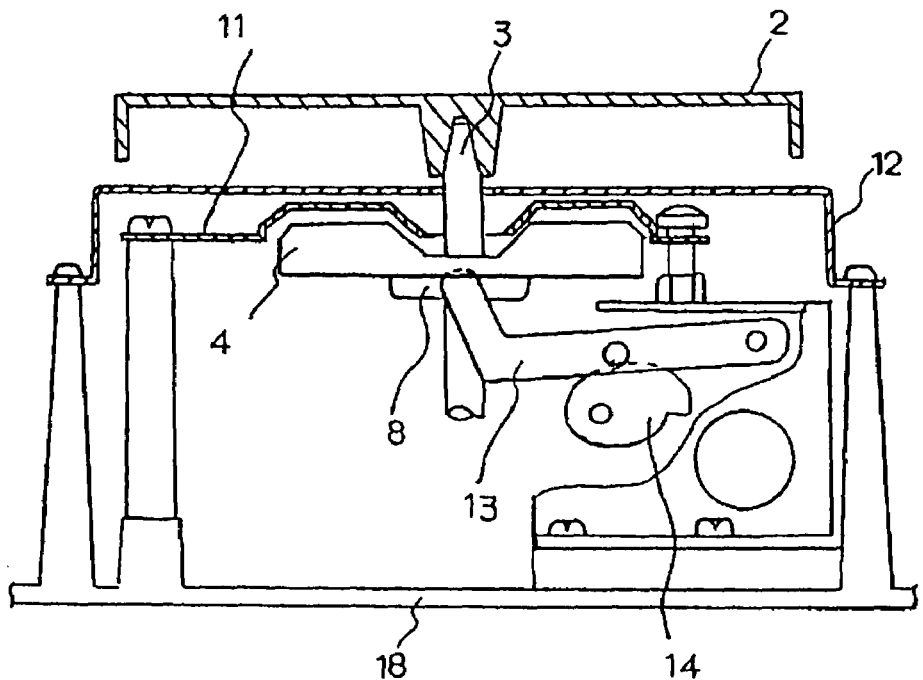
FIG. 4 is a sectional view of an electronic balance in a state where a load is loaded.

As shown in FIG. 4, when the cam 14 rotates in the clockwise direction and the leading ends of the arm assembly 13 are lowered to a lower limit, the calibration weight 4 is loaded on the load detecting unit. This state is selected when the sensitivity of the electronic balance is calibrated. In other words, when the leading ends of the arm assembly 13 are lowered, the calibration weight 4 is lowered. When the calibration weight 4 is away from the arm assembly 13, the calibration weight 4 is away from the weight holding member 11, so that the total load of the calibration weight 4 is applied to the load detecting unit through the weight receptacle 8 and sensitive member 3 in a loaded state.

Figure 5:
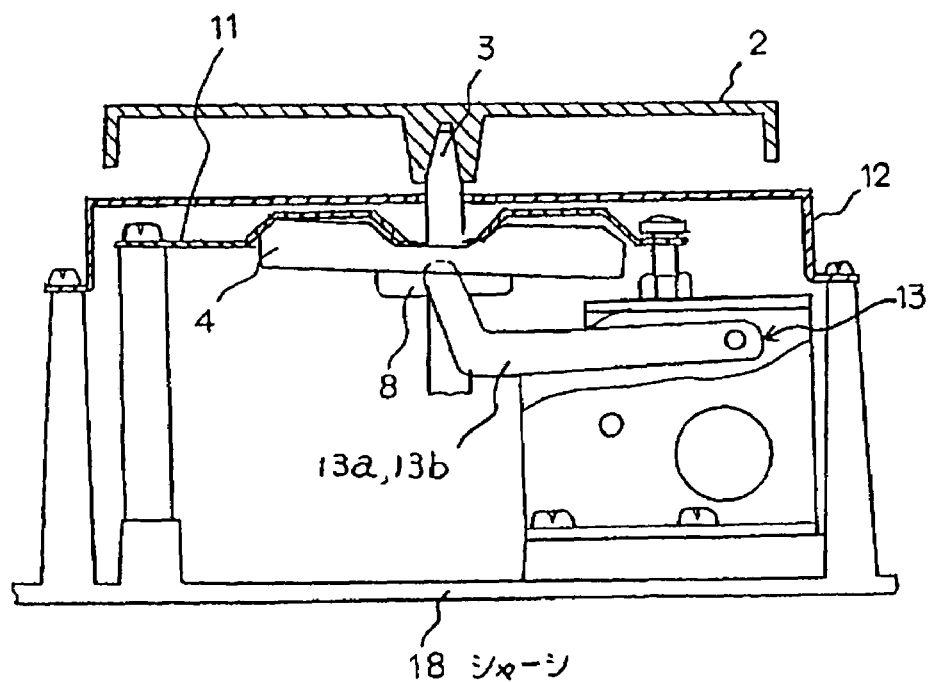
FIG. 5 is a sectional view of the electronic balance in a state in the middle of loading the load.
Figure 6:
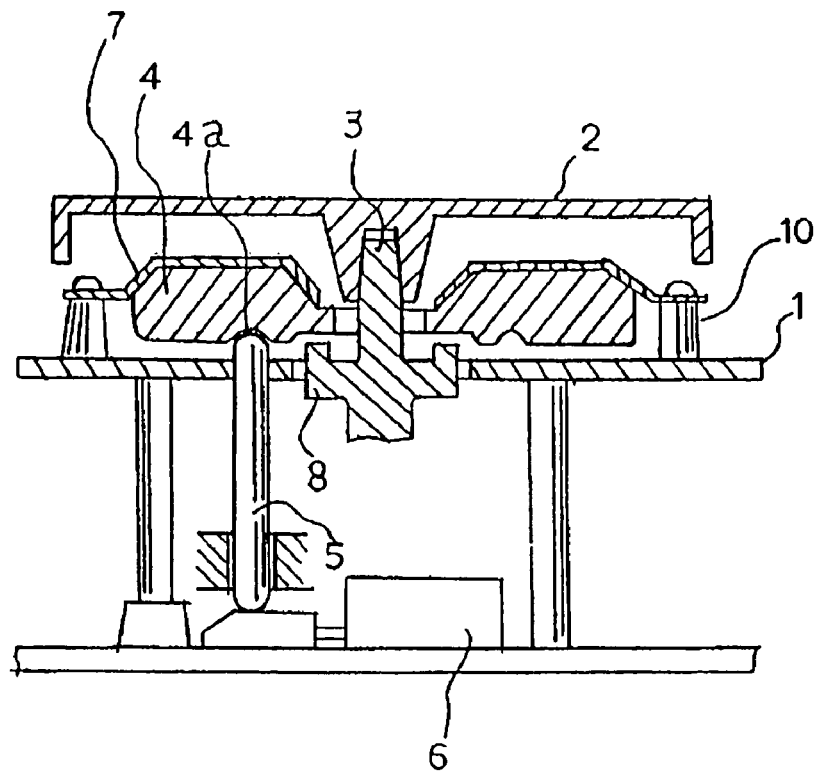
FIG. 6 is a schematic view of an essential part of a conventional electronic balance.
Figure 7:
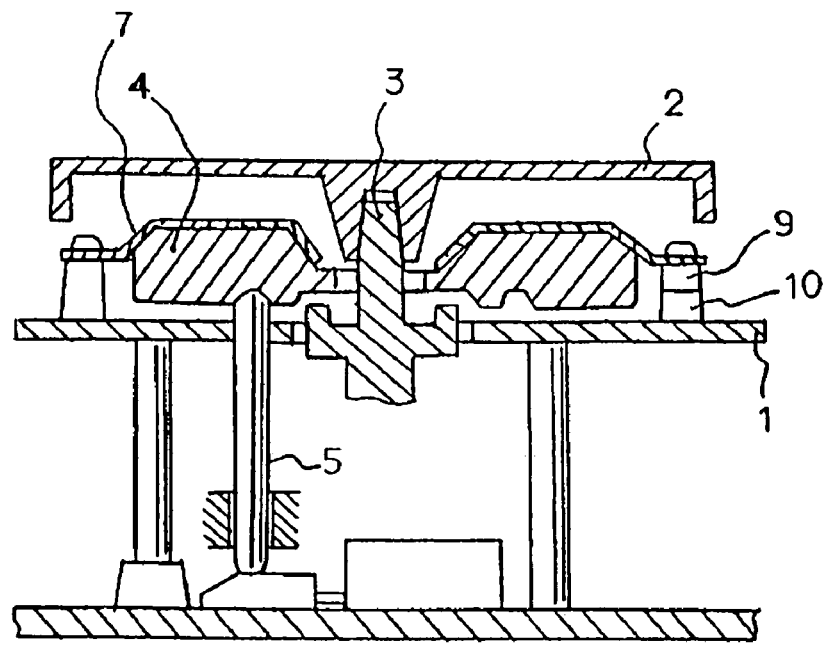
FIG. 7 is a schematic view of an essential part of another conventional electronic balance.

FIG. 5 shows the electronic balance in an intermediate state from the state shown in FIG. 4 to the state as shown in FIG. 1. More specifically, the leading ends of the arms 13a and 13b enter the concave portions in the back surface of the calibration weight 4 to lift the calibration weight 4. When the leading ends of the arm assembly 13 move further, a portion of the upper surface of the calibration weight 4 contacts the weight holding member 11. Accordingly, the weight holding member 11 holds the calibration weight 4 downwardly with the spring force thereof. When the leading ends of the arm assembly 13 move further, the calibration weight 4 rotates around the contact portion thereof so that a space between the upper surface of the calibration weight 4 and the weight holding member 11 is eliminated. In a state that the space substantially disappears, the calibration weight 4 is sandwiched and held between the weight holding member 11 and the arm assembly 13.

In the electronic balance in the state described above, the weight holding member 11 may receive a vertical impact if the electronic balance falls and the like during transportation. However, the pressing member 12 is disposed close to the weight holding member 11, so that the movement of the weight holding member 11 is restricted, thereby preventing deformation.

As described above, according to the embodiment of the present invention, the weight holding member 11 with the spring property is disposed above the calibration weight 4. One end of the weight holding member 11 is fixed and the other end thereof is vertically movable. The pressing member 12 is disposed in the vicinity of the upper portion of the weight holding member 11. When the arm assembly 13 lifts the calibration weight 4, the weight holding member 11 securely holds the calibration weight 4, irrespective of accuracy of the respective parts and assembly, or a vertical impact due to falling and the like. The present invention is not limited to the embodiment described above. For example, it is possible to use a vertical moving system formed of a sliding cam and a vertically moving bar for moving the calibration weight 4.

In the electronic balance of the present invention, the weight holding member has the spring property in the vertical direction. Accordingly, it is possible to securely hold the built-in weight without adjustment and increasing cost, thereby reducing variations in the force applied to the motor and in the motor sound. The pressing member is disposed in the upper vicinity of the weight holding member, thereby improving the impact resistance during the transportation.

While the invention has been explained with reference to the specific embodiments of the invention, the explanation is illustrative and the invention is limited only by the appended claims.

What is claimed is:

1. An electronic balance for measuring a weight of a sample, comprising:
   a pan for placing the sample,
   a load detecting unit connected to the pan for determining the weight of the sample;
   a sensitivity calibration mechanism having a calibration weight disposed under the pan for correcting a sensitivity coefficient by applying a load of the calibration weight to the load detecting unit;
   a weight holding member with a spring property disposed above the calibration weight for holding an upward movement of the calibration weight when a load of the calibration weight is not applied to the load detecting unit; and
   a pressing member disposed above the weight holding member for restricting an upward movement of the weight holding member.

2. An electronic balance according to claim 1, wherein said load detecting unit converts a load of the sample placed on the pan into an electrical signal and changes the electrical signal to the weight of the sample by calculating the electric signal with the sensitivity coefficient already memorized, said sensitivity coefficient being calibrated when the load of the calibration weight is applied to the load detecting unit.

3. An electronic balance according to claim 1, wherein said calibration weight is formed in a disc shape and disposed under the pan coaxially.

4. An electronic balance according to claim 1, wherein said weight holding member has two side portions, one of said two side portions being fixed so that the other of the two side portions freely moves vertically.

5. An electronic balance according to claim 1, wherein said sensitivity calibration mechanism further includes a weight moving mechanism for moving the calibration weight vertically.

6. An electronic balance according to claim 5, wherein said weight moving mechanism includes a pair of arms to be able to move the calibration weight up and down, a gear and cam mechanism connected to the arms, and a motor connected to the gear and cam mechanism for moving the arms up and down.

7. An electronic balance according to claim 4, further comprising a stopper comprising a shaft portion attached to the other of the two side portions of the weight holding member for restricting upward movement thereof, the stopper operable to generate a repulsive force on the calibration weight when the calibration weight is lifted.

8. An electronic balance according to claim 1, wherein the pressing member is formed separately from the weight holding member and is disposed in an upper vicinity of the weight holding member close to the weight holding member to restrict a movement of the weight holding member.

9. An electronic balance for measuring a weight of a sample, comprising:
   a pan for placing the sample,
   a load detecting unit connected to the pan for determining the weight of the sample;
   a sensitivity calibration mechanism having a calibration weight disposed under the pan for correcting a sensitivity coefficient by applying a load of the calibration weight to the load detecting unit;
   a weight holding member with a spring property disposed above the calibration weight for holding an upward movement of the calibration weight when a load of the calibration weight is not applied to the load detecting unit;
   a pressing member disposed above and adjacent to the weight holding member for restricting an upward movement of the weight holding member, wherein the pressing member is formed separately from the weight holding member and is disposed in an upper vicinity of the weight holding member close to the weight holding member to restrict a movement of the weight holding member when a vertical impact is applied; and
   a stopper comprising a shaft portion attached to one side portion of the weight holding member for restricting upward movement thereof, the stopper operable to generate a repulsive force on the calibration weight when the calibration weight is lifted.

* * * * *